United States Patent
Quail (10) Patent No.: US 7,274,125 B2
(45) Date of Patent: Sep. 25, 2007

(54) CURRENT COLLECTOR RING FOR A GENERATOR HAVING BALANCE RESISTORS

(75) Inventor: Paul A Quail, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 267 days.

(21) Appl. No.: 10/907,913

(22) Filed: Apr. 20, 2005

(65) Prior Publication Data

US 2006/0238062 A1 Oct. 26, 2006

(51) Int. Cl.
*H02K 55/00* (2006.01)
(52) U.S. Cl. .................. 310/219; 310/232; 310/71; 29/597; 29/598; 322/17; 322/44
(58) Field of Classification Search ............ 310/71, 310/232, 219, 261; 29/597, 598; 322/17, 322/44
See application file for complete search history.

(56) References Cited

U.S. PATENT DOCUMENTS

| | | | |
|---|---|---|---|
| 2,798,977 A * | 7/1957 | Henter | 310/232 |
| 3,023,331 A * | 2/1962 | Hoffmann et al. | 310/232 |
| 3,573,521 A * | 4/1971 | Carson et al. | 310/219 |
| 3,601,643 A * | 8/1971 | Krulls et al. | 310/219 |
| 3,639,794 A * | 2/1972 | Karpman et al. | 310/231 |
| 3,733,502 A * | 5/1973 | Curtis et al. | 310/61 |
| 4,164,671 A * | 8/1979 | Gamble | 310/52 |
| 4,246,506 A * | 1/1981 | Vartanian et al. | 310/232 |
| 4,267,475 A * | 5/1981 | Vitchenko et al. | 310/232 |
| 4,420,198 A * | 12/1983 | Zerlik | 439/13 |
| 5,627,709 A | 5/1997 | Salasoo | 361/19 |
| 2006/0238062 A1 * | 10/2006 | Quail | 310/219 |

FOREIGN PATENT DOCUMENTS

| | | | |
|---|---|---|---|
| JP | 09-103065 | * | 4/1997 |
| JP | 63-099759 | * | 5/1998 |

* cited by examiner

*Primary Examiner*—Karl Tamai
(74) *Attorney, Agent, or Firm*—Cantor Colburn LLP

(57) ABSTRACT

An electrical generator having a stator assembly and a rotor assembly is provided. The rotor assembly has a rotor member, a first collector ring, and first and second rotor coils. The first collector ring is disposed proximate an exterior surface of the rotor member. The first collector ring has first and second balance resistors and first and second electrical terminals. The first and second balance resistors are disposed on an exterior surface of the first collector ring. The first and second balance resistors have first and second apertures, respectively extending therethough that are adjacent third and fourth apertures extending into the first collector ring. The first and second electrical terminals extend through the first and second apertures, respectively, and extend through the third and fourth apertures, respectively. The first and second balance resistors conduct first and second electrical currents to the first and second electrical terminals, respectively, that energize the first and second rotor coils, respectively. The first electrical current is substantially equal to the second electrical current.

19 Claims, 5 Drawing Sheets

CURRENT COLLECTOR RING FOR A GENERATOR HAVING BALANCE RESISTORS

BACKGROUND OF THE INVENTION

Super-conducting generators including a rotor assembly and a stator assembly have been developed. The rotor assembly has a plurality of rotor coils that are rotated to generate an electrical current in the stator assembly. A resistance of each of the rotor coils, however, may not be equal to the other rotor coils. As a result, a current through one of more of the rotor coils may not have a desired current level, which may result in an inoperabe super-conducting generator.

Accordingly, there is a need for adjusting a resistance of a current path associated with each rotor coil such that the electrical current in each rotor coil can be made substantially equal to one another.

BRIEF DESCRIPTION OF THE INVENTION

An electrical generator in accordance with an exemplary embodiment is provided. The electrical generator includes a stator assembly having a bore extending therethrough. The electrical generator further includes a rotor assembly disposed in the bore of the stator assembly. The rotor assembly has a rotor member, a first collector ring, and first and second rotor coils. The first collector ring is disposed proximate an exterior surface of the rotor member. The first collector ring has first and second balance resistors and first and second electrical terminals. The first and second balance resistors are disposed on an exterior surface of the first collector ring. The first and second balance resistors have first and second apertures, respectively extending therethough that are adjacent third and fourth apertures extending into the first collector ring. The first and second electrical terminals extend through the first and second apertures, respectively, and extend through the third and fourth apertures, respectively. The first and second balance resistors conduct first and second electrical currents to the first and second electrical terminals, respectively, that energize the first and second rotor coils, respectively. The first electrical current is substantially equal to the second electrical current.

A collector ring for use with a rotor assembly of an electrical generator in accordance with another exemplary embodiment is provided. The collector ring includes a ring-shaped member configured to be attached to the rotor assembly. The collector ring further includes first and second balance resistors disposed on an exterior surface of the ring-shaped member. The first and second balance resistors have first and second apertures, respectively, extending therethough that are adjacent third and fourth apertures extending into the ring-shaped member. The collector ring further includes first and second electrical terminals extending through the first and second apertures of the first and second balance resistors, respectively, and extending into the third and fourth apertures, respectively, in the ring-shaped member. The first and second balance resistors conduct first and second electrical currents to the first and second electrical terminals, respectively.

A method for assembling a rotor assembly of an electrical generator in accordance with another exemplary embodiment is provided. The rotor assembly has a rotor member and first and second rotor coils. The method includes disposing a first insulation layer on an exterior surface of the rotor member. The method further includes disposing a second insulation layer on an interior surface of the rotor member. The method further includes disposing a first collector ring around the rotor member adjacent the first insulation layer. The method further includes disposing a third insulation layer about a periphery of a first aperture extending through the first collector ring and a second aperture extending through a portion of the rotor member. The method further includes disposing a first balance resistor having a third aperture extending therethrough adjacent an outer surface of the first collector ring. The third aperture is aligned with the first aperture of the first collector ring. The method further includes inserting a first electrical terminal through the first, second, and third apertures, and further through a fourth aperture of the second insulation layer, such that the first electrical terminal is disposed adjacent the balance resistor and is electrically coupled to the first rotor coil. The method further includes disposing a fourth insulation layer about a periphery of a fifth aperture extending through the first collector ring and a sixth aperture extending through a portion of the rotor member. The method further includes disposing a second balance resistor having a seventh aperture extending therethrough adjacent an outer surface of the collector ring, the seventh aperture aligning with the fifth aperture of the first collector ring. The method further includes inserting a second electrical terminal through the fifth, sixth, and seventh apertures, and further through an eighth aperture of the second insulation layer, such that the second electrical terminal is disposed adjacent the second balance resistor and is electrically coupled to the second rotor coil. The method further includes measuring a first electrical resistance of a first electrical circuit having at least the first balance resistor and the first rotor coil, and a second electrical resistance of a second electrical circuit having at least the second balance resistor and the second rotor coil. The method further includes removing a portion of one of the first and second balance resistors in one of the first and second rotor coil circuits having a lower resistance, such that the first electrical resistance is substantially equal to the second electrical resistance.

Other systems and/or methods according to the embodiments will become or are apparent to one with skill in the art upon review of the following drawings and detailed description. It is intended that all such additional systems and methods be within the scope of the present invention, and be protected by the accompanying claims.

DETAILED DESCRIPTION OF THE INVENTION

Figure 1:
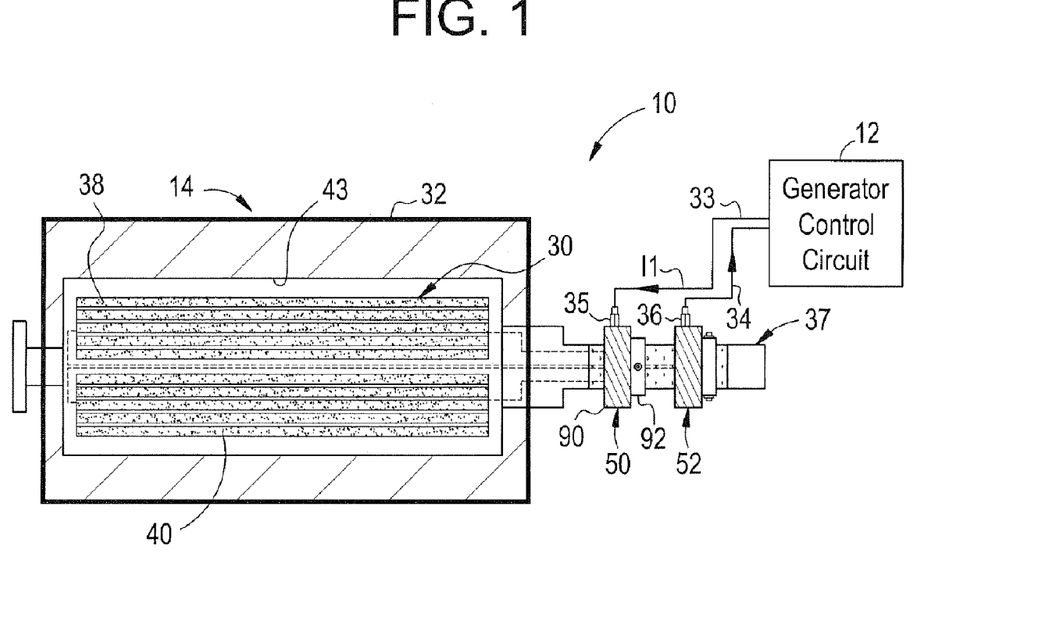
FIG. 1 is a schematic of a power generation system having a super-conducting electrical generator in accordance with an exemplary embodiment.

Referring to FIG. 1, a power generation system 10 is illustrated. The power generation system 10 includes a generator control circuit 12 and a super-conducting electrical generator 14. An advantage of the power generation system 10 is that the system utilizes a rotor assembly with balancing resistors coupled to an external surface of the rotor assembly that can be easily "trimmed" to obtain balanced currents within the rotor assembly coils. The term "balance resistor" means a resistor used for adjusting an electrical current level supplied to a rotor coil.

The generator control circuit 12 generates an electrical current (I1) that propagates through the conductive line 33 and stationery brush 35 to the super-conducting electrical generator 14 for controlling an amount of electrical power generated by the generator 14. The generator control circuit 12 further receives an electrical current (I4) from the rotor coils of the generator 14 via the brushes 36 and the conductive line 34.

Figure 2:
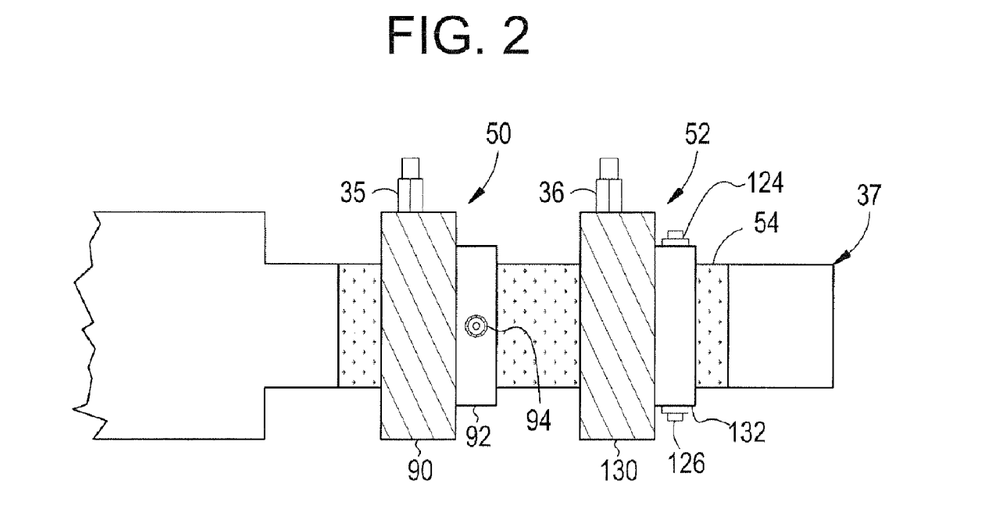
FIG. 2 is a schematic of a rotor assembly utilized in the super-conducting electrical generator of FIG. 1.

Referring to FIGS. 1 and 2, the super-conducting electrical generator 14 is provided to generate electrical power in response to rotation of the rotor assembly 30. The generator 14 includes the rotor assembly 30, a stator assembly 32, conductive lines 33, 34, and brushes 35, 36.

The rotor assembly 30 is provided to be at least partially disposed within a bore 43 of the stator assembly 32 and to rotate within the bore 43 to generate electrical current within the stator assembly 32. The rotor assembly 30 includes a rotor member 37, rotor coils 38, 40, collector rings 50, 52, an insulation layer 54, and conductive lines 60, 62, 64, 66, 68, 76.

The rotor member 37 is configured to rotate within the stator assembly 32. The rotor coils 38, 40 are operably coupled to the rotor member 37 and rotate with the rotor member 37 within the bore 43 of the stator assembly 32. The rotor coils 38, 40 are electrically coupled to the collector rings 50, 52 as will be explained in greater detail below.

Figure 3:
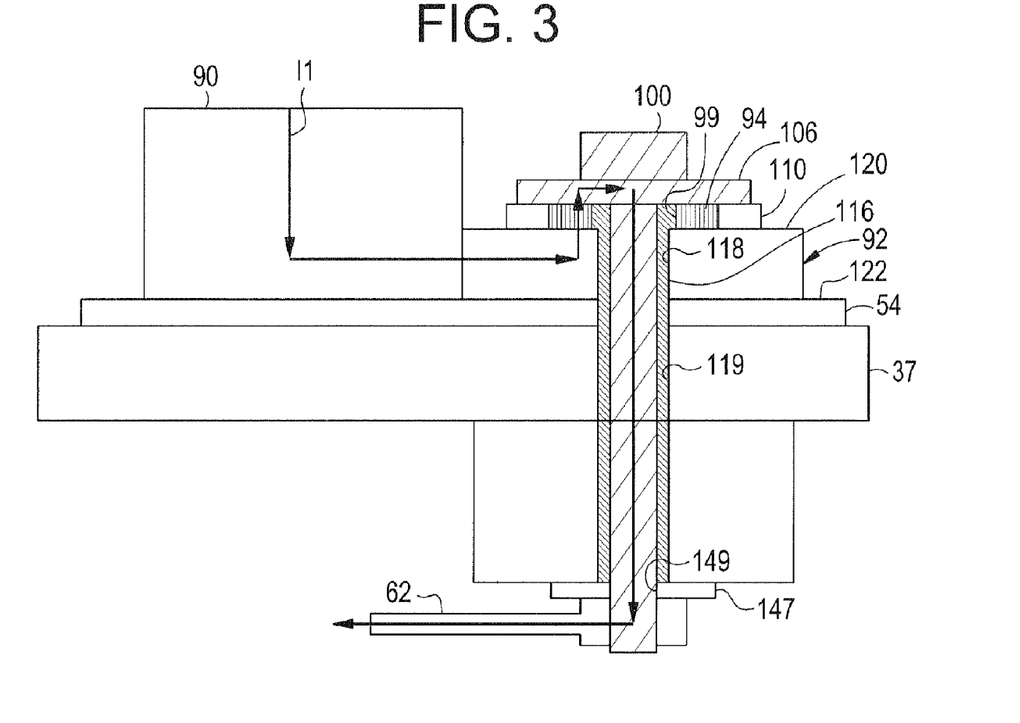
FIG. 3 is a cross-sectional schematic of a portion of a collector ring utilized in the rotor assembly of FIG. 2 in accordance with another exemplary embodiment.

Referring to FIGS. 1-4, the collector ring 50 is provided to route electrical current (I1) from the brushes 35 to the rotor coils 38, 40. The collector ring 50 includes ring portions 90, 92 that are integrally coupled together, balance resistors 94, 96, electrical terminals 100, 102, two resistor covers 110 (one is shown in FIG. 3), two insulation layers 116 (one is shown in FIG. 3), and an insulation layer 147.

Figure 4:
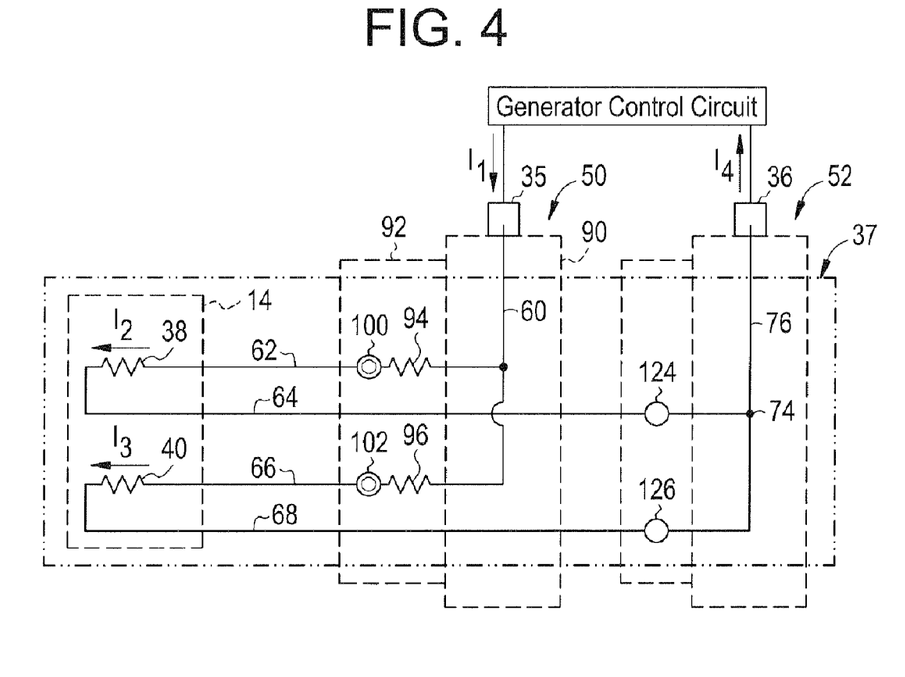
FIG. 4 is an electrical schematic of the super-conducting electrical generator of FIG. 1.

Referring to FIGS. 3 and 4, the ring portions 90, 92 are configured to be disposed around an exterior surface of the rotor member 37 and are both constructed from an electrically conductive metal. The insulation layer 54 is disposed on an exterior surface of the rotor member 37 and the ring portions 90, 92 are disposed on an exterior surface of the insulation layer 54. Thus, the insulation layer 54 insulates the ring portions 90, 92 from the rotor member 37. A diameter of the ring portion 90 is greater than a diameter of the ring portion 92. The ring portion 90 is electrically coupled to the brushes 35 and receives the electrical current (I1) from the generator control circuit 12. The ring portion 92 includes two apertures 118 that extend from an outer surface 120 of the ring portion 92 to an inner surface 122 thereof. The rotor member 37 includes two apertures 119 (one is shown in FIG. 3) that extend into the rotor member 37. Each aperture 118 of the ring portion 92 is disposed adjacent one of the apertures 119.

Balance resistors 94, 96 are provided to be electrically coupled in series to rotor coils 38, 40, respectively, for balancing electrical currents (I2), (I3), received by the rotor coils 38, 40, respectively. The balance resistors 94, 96 can be trimmed by removing material therefrom such that (i) a first electrical resistance of the resistor 94, the rotor coil 38, the electrical terminal 100, conductive lines 62, 64, and attachment terminal 124, and (ii) a second electrical resistance of the resistor 96, the rotor coil 40, the electrical terminal 102, conductive lines 66, 68, and attachment terminal 126, are equal to one another. The balance resistors 94, 96 are constructed from a carbon or a carbon composite. For example, the resistors 94, 96 can be constructed from graphite. Each of the resistors 94, 96 has an aperture 99 extending therethrough. The aperture 99 in each of resistors 94, 96 is aligned with a corresponding one of the two apertures 118 extending through the collector ring 50. Further, a tubular-shaped insulation layer 116 is disposed within each aperture 99 of each balance resistor and further through an adjacent aperture 118 extending through the ring portion 92, and through an adjacent aperture 119 in the rotor member 37.

Referring to FIGS. 2, 3 and 4, the electrical terminals 100, 102 are provided to receive the electrical currents (I2), (I3) that have propagated through the balance resistors 94, 96, respectively, and to conduct the electrical currents to the motor coils 38, 40, respectively. Each of the electrical terminals 100, 102 is constructed from a conductive metal. For example, the electrical terminals 100, 102 can be constructed from steel. Further, each of the electrical terminals 100, 102 includes a head portion 106 and a shaft portion 108. The head portion 106 of each of electrical terminals 100, 102 is configured to be disposed against a corresponding balance resistor for receiving the electrical current from the corresponding balance resistor. The shaft portion 108 of each of electrical terminals 100, 102 is configured to be received within a tubular insulation member 116, each insulation member 116 being further disposed in corresponding apertures 99, 118, 119. An insulation member 147 is disposed adjacent each of the apertures 119 in the rotor member 37. The insulation member 147 includes an aperture 149 extending therethrough that is aligned with a corresponding aperture 119. Each shaft portion 108 further extends through a corresponding aperture 149 and is electrically coupled to a corresponding conductive line that is further electrically coupled to a corresponding motor coil.

The resistor covers 110 (one is shown in FIG. 3) are provided to cover the balance resistors 94, 96 and to protect the balance resistors from being damaged during use. Each of the resistor covers 110 comprises an epoxy layer that is placed on an outer peripheral side of the balance resistors.

Referring to FIGS. 1 and 2, the collector ring 52 is provided to route the electrical current (I4) from the rotor coils 38, 40 to the generator control circuit 12. The collector ring 52 includes ring portions 130, 132 that are integrally coupled together, and attachment terminals 124, 126.

The ring portions 130, 132 are configured to be disposed around an exterior surface of the rotor member 37 and are both constructed from an electrically conductive metal. The ring portions 130, 132 are disposed on an exterior surface of the insulation layer 54 and are shrunk fit around the layer 54 onto the rotor member 37. Thus, the insulation layer 54 insulates the ring portions 130, 132 from the rotor member 37. A diameter of the ring portion 130 is greater than a diameter of the ring portion 132. The ring portion 132 is electrically coupled to the brushes 36 and conducts the electrical current (I4) to the generator control circuit 12. The attachment terminals 124, 126 extend through apertures in the ring portion 132 and are electrically coupled to conductive lines from the motor coils.

Referring to FIG. 4, the flow of electrical current through the rotor assembly 30 will now be described. The generator control circuit 12 transmits an electrical current (I1) through the conductive line 33 to the brushes 35. The electrical current (I1) is transferred from the brushes 35 to the ring portion 90 of the collector ring 50. The electrical current (I1) is conducted from the ring portion 90 through the balance resistors 94, 96. The current (I1) is split into electrical currents (I2), (I3) which propagate through conductive lines 62, 66 to motor windings 38, 40 respectively. As discussed above, electrical currents (I2), (I3) are substantially equal in magnitude to one another, due to the balance resistors 94, 96. Thereafter, electrical currents (I2), (I3) propagate through conductive lines 64, 68 to the node 74 in the collector ring 52. Thereafter, the electrical current (I4), which is the sum of the electrical currents (I2), (I3) propagates from the collector ring 52 through the brushes 36 to the generator control circuit 12.

Referring to FIGS. 3-7, a method for assembling a rotor assembly of the electrical generator 14 will now be described. In particular, the following method will describe the installation of the balance resistors 94, 96 on the collector ring 50 of the rotor assembly 30.

Figure 5:
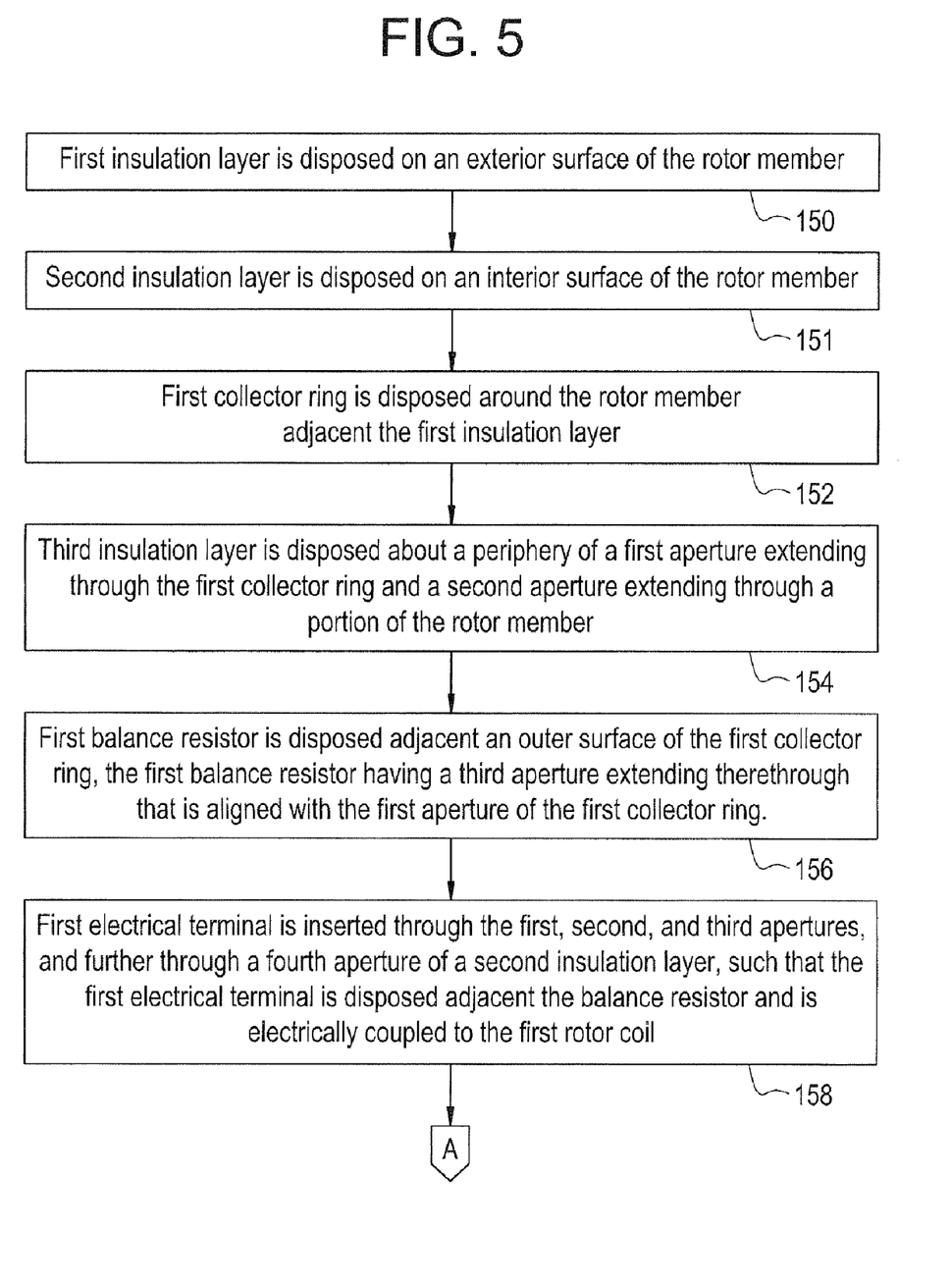
FIGS. 5-7 are a flowchart of a method for assembling a rotor assembly of the super-conducting electrical generator of FIG. 1.

At step 150, the insulation layer 54 is disposed on an exterior surface of the rotor member 37.

At step 151, the insulation layer 147 is disposed on an interior surface of the rotor member 37.

At step 152, the collector ring 50 is disposed around the rotor member 37 adjacent the insulation layer 54.

At step 154, the insulation layer 116 is disposed about a periphery of both the aperture 118 extending through the collector ring 50, and the aperture 119 extending through a portion of the rotor member 37.

At step 156, the balance resistor 94 is disposed adjacent an outer surface of the collector ring 50. The balance resistor 94 has an aperture 99 extending therethrough that is aligned with the aperture 118 of the collector ring 50.

At step 158, the electrical terminal 100 is inserted through the apertures 99, 118, 119, 149 such that the electrical terminal 100 is disposed adjacent the balance resistor 94 and is electrically coupled to the rotor coil 38.

Figure 6:
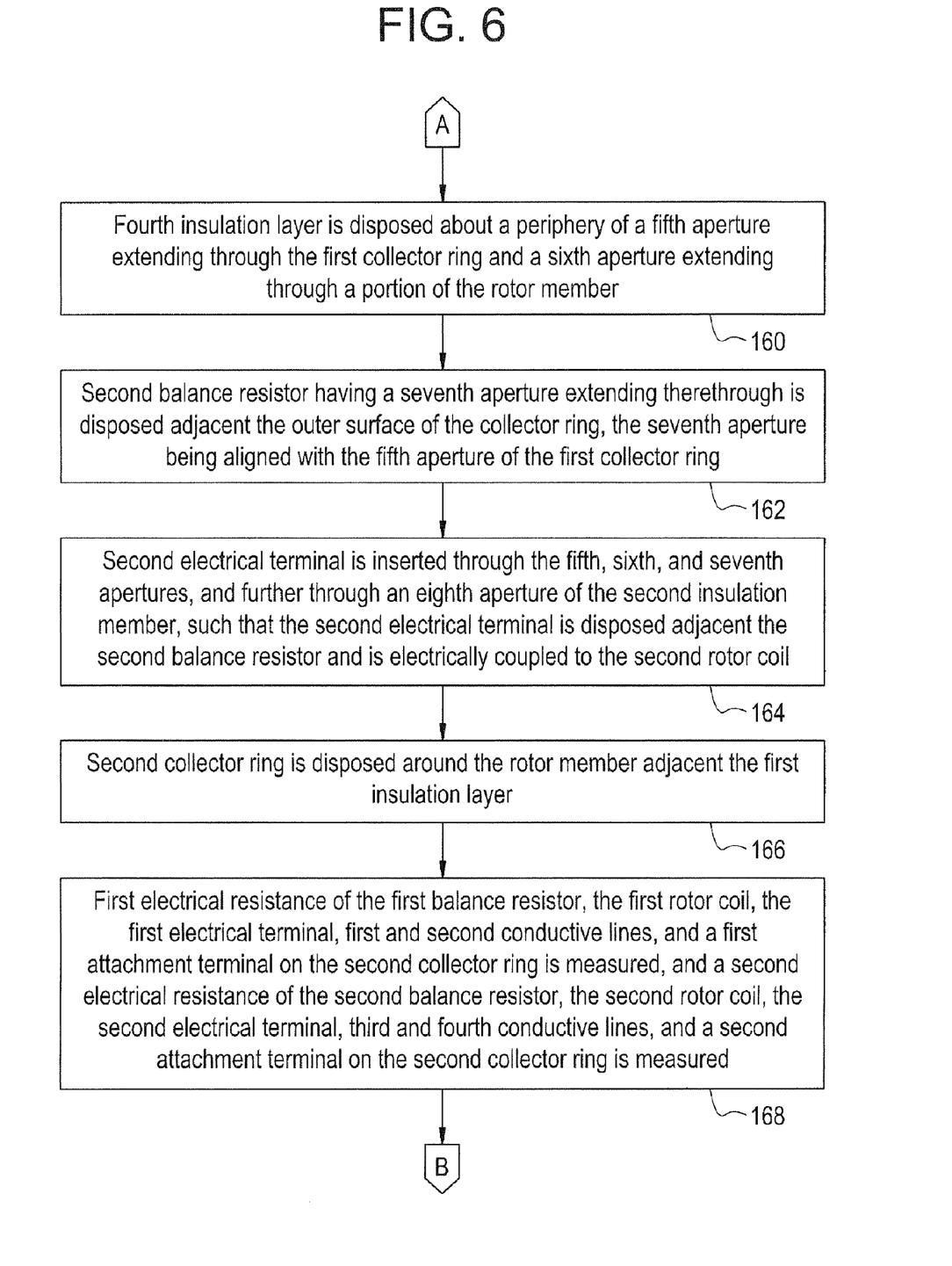

At step 160, a corresponding insulation layer 116 is disposed about a periphery of both a corresponding aperture 118 extending through the collector ring 50, and a corresponding aperture 119 extending through a portion of the rotor member 37.

At step 162, the balance resistor 96, having a corresponding aperture 99 extending therethrough, is disposed adjacent the outer surface of the collector ring 50. The aperture 99 is aligned with an aperture 118 of the collector ring 50.

At step 164, the electrical terminal 102 is inserted through the corresponding apertures 99, 118, 119, 149 such that the electrical terminal 102 is disposed adjacent the balance resistor 96 and is electrically coupled to the rotor coil 40.

At step 166, the collector ring 52 is disposed around the rotor member 37 adjacent the insulation layer 54 and the attachment terminals 124, 126 are installed therein.

Figure 7:
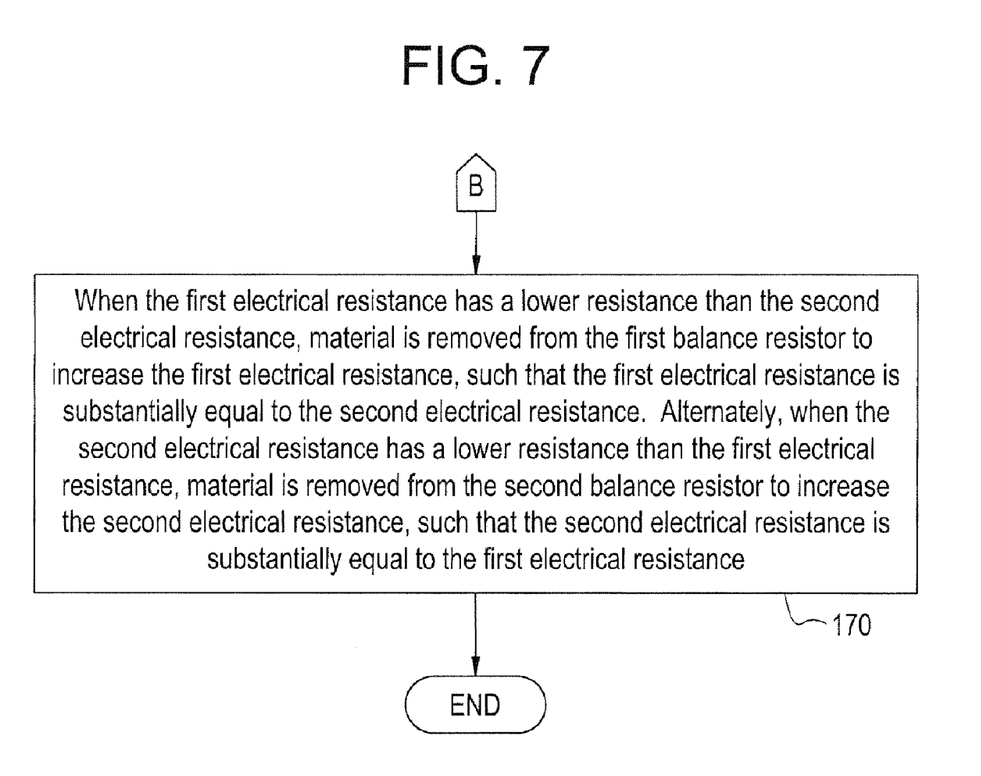

At step 168, a first electrical resistance of the balance resistor 94, the rotor coil 38, the electrical terminal 100, conductive lines 62, 64, and an attachment terminal 124 is measured, and a second electrical resistance of the balance resistor 96, the rotor coil 40, the electrical terminal 102, conductive lines 66, 68, and an attachment terminal 126, is measured.

At step 170, when the first electrical resistance has a lower resistance than the second electrical resistance, material can be removed from the balance resistor 94 to increase the first electrical resistance, such that the first electrical resistance is substantially equal to the second electrical resistance. Alternately, when the second electrical resistance has a lower resistance than the first electrical resistance, material can be removed from the balance resistor 96 to increase the second electrical resistance, such that the second electrical resistance is substantially equal to the first electrical resistance.

After step 170, the method is completed.

The electrical generator, the collector ring, and a method for assembling a rotor assembly of the electrical generator provide a substantial advantage over other systems and methods. In particular, the electrical generator provides a technical effect of utilizing a collector ring with exterior balance resistors for adjusting resistances of current paths associated with rotor coils such that each of the rotor coil currents can be made substantially equal to one another. Further, because the balance resistors 94, 96 are located external to the collector ring 50, a transfer of heat energy to the rotor member 37 is reduced as compared to a generator having a balance resistor inside of the rotor member 37.

While the invention is described with reference to an exemplary embodiment, it will be understood by those skilled in the art that various changes may be made an equivalence may be substituted for elements thereof without departing from the scope of the invention. In addition, many modifications may be made to the teachings of the invention to adapt to a particular situation without departing from the scope thereof. Therefore, is intended that the invention not be limited the embodiment disclosed for carrying out this invention, but that the invention includes all embodiments falling with the scope of the intended claims. Moreover, the use of the term's first, second, etc. does not denote any order of importance, but rather the term's first, second, etc. are us are used to distinguish one element from another.

What is claimed is:

1. An electrical generator, comprising:
   a stator assembly having a bore extending therethrough; and
   a rotor assembly disposed in the bore of the stator assembly, the rotor assembly having a rotor member, a first collector ring, and first and second rotor coils, the first collector ring disposed proximate an exterior surface of the rotor member, the first collector ring having first and second balance resistors and first and second electrical terminals, the first and second balance resistors being disposed on an exterior surface of the first collector ring, the first and second balance resistors having first and second apertures, respectively extending therethough that are adjacent third and fourth apertures extending into the first collector ring, the first and second electrical terminals extending through the first and second apertures, respectively, and extending through the third and fourth apertures, respectively, the first and second balance resistors conducting first and second electrical currents to the first and second electrical terminals, respectively, that energize the first and second rotor coils, respectively, the first electrical current being substantially equal to the second electrical current.

2. The electrical generator of claim 1, wherein a first electrical resistance of a first rotor coil circuit having the first balance resistor and the first rotor coil is substantially similar a second electrical resistance of a second rotor coil circuit having the second balance resistor and the second rotor coil.

3. The electrical generator of claim 1, wherein the first balance resistor is constructed from carbon or a carbon composite.

4. The electrical generator of claim 1, wherein the first balance resistor is constructed from graphite.

5. The electrical generator of claim 1, wherein the first balance resistor is substantially ring-shaped.

6. The electrical generator of claim 1, wherein the first electrical terminal comprises a head portion and a shaft portion, the first balance resistor being disposed between the head portion and the outer surface of the first collector ring, the shaft portion extending through the first aperture of the first balance resistor.

7. The electrical generator of claim 1, wherein a first insulating layer is disposed between the first collector ring and the rotor assembly, the shaft portion of the first electrical terminal extending through the first insulating layer.

8. The electrical generator of claim 7, wherein a second insulting layer is disposed between the first balance resistor and the first electrical terminal and is further disposed within the first aperture of the first balance resistor and the third aperture of the first collector ring.

9. The electrical generator of claim 1, wherein the rotor assembly further comprises a second collector ring, the second collector ring being disposed proximate the exterior surface of the rotor member, the second collector ring being electrically coupled to the first and second rotor coils.

10. A collector ring for use with a rotor assembly of an electrical generator, comprising:
a ring-shaped member configured to be attached to the rotor assembly; first and second balance resistors disposed on an exterior surface of the ring-shaped member, the first and second balance resistors having first and second apertures, respectively, extending therethough that are adjacent third and fourth apertures extending into the ring-shaped member; and first and second electrical terminals extending through the first and second apertures of the first and second balance resistors, respectively, and extending into the third and fourth apertures, respectively, in the ring-shaped member, the first and second balance resistors conducting first and second electrical currents to the first and second electrical terminals, respectively.

11. The collector ring of claim 10, wherein the first balance resistor is constructed from carbon or a carbon composite.

12. The collector ring of claim 10, wherein the first balance resistor is constructed from graphite.

13. The collector ring of claim 10, wherein the first balance resistor is substantially ring-shaped.

14. The collector ring of claim 10, wherein the first electrical terminal comprises a head portion and a shaft portion, the first balance resistor being disposed between the head portion and the outer surface of the ring-shaped member, the shaft portion extending through the first aperture of the first balance resistor.

15. The collector ring of claim 14, wherein an insulting layer is disposed between the first balance resistor and the first electrical terminal and is further disposed within the first aperture of the first balance resistor and the third aperture of the ring-shaped member.

16. A method for assembling a rotor assembly of an electrical generator, the rotor assembly having a rotor member and first and second rotor coils, the method comprising:
disposing a first insulation layer on an exterior surface of the rotor member;
disposing a second insulation layer on an interior surface of the rotor member;
disposing a first collector ring around the rotor member adjacent the first insulation layer;
disposing a third insulation layer about a periphery of a first aperture extending through the first collector ring and a second aperture extending through a portion of the rotor member;
disposing a first balance resistor having a third aperture extending therethrough adjacent an outer surface of the first collector ring, the third aperture aligning with the first aperture of the first collector ring;
inserting a first electrical terminal through the first, second, and third apertures, and further through a fourth aperture of the second insulation layer, such that the first electrical terminal is disposed adjacent the balance resistor and is electrically coupled to the first rotor coil;
disposing a fourth insulation layer about a periphery of a fifth aperture extending through the first collector ring and a sixth aperture extending through a portion of the rotor member;
disposing a second balance resistor having a seventh aperture extending therethrough adjacent an outer surface of the collector ring, the seventh aperture aligning with the fifth aperture of the first collector ring;
inserting a second electrical terminal through the fifth, sixth, and seventh apertures, and further through an eighth aperture of the second insulation layer, such that the second electrical terminal is disposed adjacent the second balance resistor and is electrically coupled to the second rotor coil;
measuring a first electrical resistance of a first electrical circuit having at least the first balance resistor and the first rotor coil, and a second electrical resistance of a second electrical circuit having at least the second balance resistor and the second rotor coil; and
removing a portion of one of the first and second balance resistors in one of the first and second rotor coil circuits having a lower resistance, such that the first electrical resistance is substantially equal to the second electrical resistance.

17. The method of claim 16, wherein the first balance resistor is constructed from carbon or a carbon composite.

18. The method of claim 16, wherein the first balance resistor is constructed from graphite.

19. The method of claim 16, wherein the first electrical terminal comprises a head portion and a shaft portion, the first balance resistor being disposed between the head portion and the outer surface of the first collector ring, the shaft portion extending through the third aperture of the first balance resistor.

* * * * *

UNITED STATES PATENT AND TRADEMARK OFFICE
CERTIFICATE OF CORRECTION

| | |
|---|---|
| PATENT NO. | : 7,274,125 B2 |
| APPLICATION NO. | : 10/907913 |
| DATED | : September 25, 2007 |
| INVENTOR(S) | : Paul A. Quail |

It is certified that error appears in the above-identified patent and that said Letters Patent is hereby corrected as shown below:

Column 1, line 4: Before the BACKGROUND OF THE INVENTION, please insert -- This invention may have been made with U.S. Government support under Contract No. DE-FC36-02GO11100 awarded by the Department of Energy. The U.S. Government may have certain rights in this invention. --

Signed and Sealed this

First Day of July, 2008

JON W. DUDAS
*Director of the United States Patent and Trademark Office*